United States Patent [19]
Henley

[11] Patent Number: 5,406,213
[45] Date of Patent: Apr. 11, 1995

[54] INSTRUMENT FOR TESTING LIQUID CRYSTAL DISPLAY BASE PLATES

[75] Inventor: Francois J. Henley, Los Gatos, Calif.

[73] Assignee: Photon Dynamics, Inc., Milpitas, Calif.

[21] Appl. No.: 758,895

[22] Filed: Sep. 10, 1991

[51] Int. Cl.$^6$ .......................................... G01R 31/28
[52] U.S. Cl. ........................................ 324/753; 324/96
[58] Field of Search ............... 324/158 R, 96, 73.1, 324/750, 753, 765, 770; 359/215, 248; 358/106, 107; 382/2; 257/48

[56] References Cited

U.S. PATENT DOCUMENTS

| | | | |
|---|---|---|---|
| 3,889,053 | 6/1975 | Lloyd et al. | 324/158 R |
| 3,992,663 | 11/1976 | Seddick | 324/52 |
| 4,368,523 | 1/1983 | Kawate | 365/63 |
| 4,507,605 | 3/1985 | Geisel | 324/73 |
| 4,523,847 | 6/1985 | Bjorklund et al. | 356/349 |
| 4,542,333 | 9/1985 | Koontz | 324/52 |
| 4,618,819 | 10/1986 | Mourou et al. | 324/77 |
| 4,631,576 | 12/1986 | St. John | 358/65 |
| 4,633,242 | 12/1986 | Sekiya | 340/719 |
| 4,688,900 | 8/1987 | Doane et al. | 350/347 |
| 4,758,092 | 7/1988 | Heinrich et al. | 356/36 |
| 4,825,201 | 8/1989 | Watanabe et al. | 340/717 |
| 4,855,591 | 8/1989 | Nakamura et al. | 250/225 |
| 4,862,075 | 8/1989 | Choi et al. | 324/158 |
| 4,870,357 | 9/1989 | Young et al. | 324/158 R |
| 4,875,006 | 10/1989 | Henley et al. | 324/158 |
| 4,906,922 | 6/1990 | Takahashi et al. | 324/158 |
| 4,910,458 | 3/1990 | Forsyth et al. | 324/158 |
| 4,944,576 | 7/1990 | Lacker et al. | 350/334 |
| 4,983,911 | 1/1991 | Henley | 324/158 |
| 5,274,325 | 12/1993 | Shinagawa et al. | 324/96 |

OTHER PUBLICATIONS

Testing and Qualifications of A–Si TFT–LC Color Cells for Military Avionics Applications; F. C. Luo et al.; SID 90 Digest; pp. 194–196.
Hitachi LCD Advertisement; pp. 2 and 3.
Measurement of Electro–Optic Characteristics of LCDs; M. E. Becker et al.; SID 90 Digest; pp. 163–166.
In–Process Testing of Thin Film Transistor Arrays; R. Wisnieff et al.; SID 90 Digest pp. 190–193.
NCAP Displays: Optical Switching and Dielectric Properties; L. Welsh et al.; SID 90 Digest; pp. 220–223.

Primary Examiner—Vinh Nguyen
Attorney, Agent, or Firm—Townsend and Townsend Khourie and Crew

[57] ABSTRACT

An instrument for testing defects on active matrix liquid crystal display base plates used for liquid crystal display panels. The instrument includes a testing device having an electro-optical element and active matrix liquid crystal display base plate, a light source for emitting light to said base plate, a light guide for guiding light perpendicular to said electro-optical element, and a photoreceiver for receiving light reflected from the electro-optical element. The lighting device has a halogen light, a filter, and other elements, and the electro-optical element is equipped with an optically reflective part made of a dielectric multi-layer coating. The light guide has a translucent mirror incorporated inside a transparent vessel and is positioned at an angle with respect to the optical axis. The instrument can also detect various defects in active matrix liquid crystal display base plates with high accuracy.

19 Claims, 8 Drawing Sheets

INSTRUMENT FOR TESTING LIQUID CRYSTAL DISPLAY BASE PLATES

BACKGROUND OF THE INVENTION

This invention generally relates to a testing instrument which detects defects in liquid crystal display base plates that are used for liquid crystal display panels, and the like.

When the area and the density of a liquid crystal display panel are increased to be suitable for use in a liquid crystal television, active matrix type liquid crystal display panels which utilize active matrix liquid crystal display base plates comprising multiple pixel element electrodes installed for each of the pixel elements arranged in lines, gate and source leads installed on each of the pixel element electrodes, and thin film transistors are preferred. At present, commercialization of these devices has been implemented with relatively small devices. Typically, liquid crystal display panels of this type are manufactured whereupon a transparent base plate, or the like, is placed over the active matrix liquid crystal display base plate via a spacer, then liquid crystal is sealed in the space between the active matrix liquid crystal display base plate and the transparent base plate.

Many liquid crystal televisions (TV's) currently in production employ liquid crystal display panels which have 250,000 to 500,000 pixel elements, and some with over 1,000,000 pixel elements.

To build such a large number of pixel elements and the corresponding number of leads on a base plate, various forming processes are performed inside a clean room where dust is kept at an extremely low level. When the width of the pixel element and the lead is extremely small, the presence of a trace amount of micro dust in the manufacturing environment is directly related to breakage or short-circuits of the pixel element electrodes, gate leads, and source leads. At present, up to 10 of those defects are accepted on an active matrix liquid crystal display base plate, but a product is considered defective if the number of defects exceeds this limit.

Using the present manufacturing technology, it is difficult to reduce these defects to keep within the allowable limit. Consequently, liquid crystal display panels with a large number of pixel elements have a significantly high number which are defective, causing the high prices of large liquid crystal panels.

SUMMARY OF THE INVENTION

Testing using probes has been known as one method to test active matrix liquid crystal display base plates upon completion thereof. However, the number of the elements on an active matrix liquid crystal display base plate is so large that the method requires a lengthy testing process, and is hence impractical.

No in-line testing has traditionally been conducted on active matrix liquid crystal display base plates until they are sent to final assembly where a visual check is executed by energizing the finished liquid crystal display panels to verify actual functioning of each pixel element. Defects discovered at this point are difficult to correct and the products are disposed of, thus creating very poor yield of active matrix liquid crystal displays.

This invention offers a solution to that problem, wherein a testing instrument capable of sure and quick detection of the defects in liquid crystal display base plates prior to the assembly of liquid crystal panels, and of easy identification of the quantity and the type of the defects.

In order to solve this problem, an instrument for testing liquid crystal display base plates with thin layer transistors, having multiple gate leads, multiple source leads, and multiple pixel element electrodes formed thereon, a test device containing an electro-optical element having an optically reflective part at the lower portion thereof and a transparent electrode at the upper portion thereof, and in which the optical properties change when an electrical field is applied across the electro-optical element is utilized. The electro-optical element is disposed over the upper surface of said liquid crystal display plate with a small gap therebetween a device for emitting light into the electro-optical element, a light guide for directing light emitted by said lighting device mainly perpendicularly to the upper surface of said electro-optical element while at the same time directing light reflected by said electro-optical element away from said lighting device, and an imaging device having a photo-receiver for capturing reflected light from said electro-optical element through said light guide are used to detect changes in the optical characteristics of the electro-optical element.

Electro-optical elements will change their optical properties when an electrical field is applied thereto. Therefore, if the electro-optical elements are placed over a liquid crystal display base plate and pixel element electrodes on the liquid crystal display base plate and transparent electrodes at the upper portion of the electro-optical elements are energized, an electrical field generated by each pixel element electrode will change the optical properties of the electro-optical element. If a broken line exists in a pixel element electrode, gate lead, source lead, or in other parts, energizing will not cause a portion of the pixel element electrode to function, producing no changes in the optical properties of the electro-optical element over the defective pixel element electrode.

The scanning light is transmitted and received through an electro-optical element, perpendicular to the electro-optical element, and reflected by its optically reflective part, causing light to go and return on an identical optical path within the electro-optical element. Consequently, the scanning light is immune to angle dependency of the electro-optical element, thus producing optimum efficiency and resolution.

If a short-circuit is present, energizing either a source lead or a gate lead will result in an abnormal phenomenon, which would not occur in a normal pixel element. In this way, detection by a photo-receiver of changes in the optical properties of an electro-optical element enables comprehensive and prompt discovery of defects in a liquid crystal display base plate.

Halogen light, or other non-coherent light such as an LED is preferred as a light source. Halogen light does not generate speckle noise and is less expensive than a laser beam. Speckle noise is a fine speckle of light produced on the surface of an electro-optical element when the laser beam enters the element. Such speckles become ingredients of noise during the detection process.

Using primarily red color light by installing a red filter at the light source improves the efficiency for the electro-optical element to allow or not to allow the passage of light. This also provides easy detection of the light reflected by the electro-optical elements by a photo-receiver.

Utilization of a dielectric multi-layer coating for the optically reflective part on the lower portion of the electro-optical element prevents the optically reflective part from affecting the electrical field. The electrical field is applied to the electro-optical element by energizing the terminals of the elements on the liquid crystal display base plate and the transparent electrodes on the electro-optical element. Use of an electrically conductive material for the optically reflective part will affect the electric field applied to the electro-optical element and thus is undesirable.

The surface on the photo-receiver side of the transparent vessel which incorporates a translucent mirror is angled with respect to a plane perpendicular to the optical axis, thus preventing light reflected by the photo-receiver side of the transparent vessel from entering into the photo-receiver. No unnecessary lights will enter the photo-receiver.

DESCRIPTION OF DRAWINGS

FIG. 2 (a) is an enlargement of an active matrix liquid crystal display base plate which is tested by the present invention:

FIG. 2 (b) is a top view of the first example of shorting bar construction;

FIG. 2 (c) is a top view of the second example of shorting bar construction;

FIG. 2 (d) is a top view of the third example of shorting bar construction;

FIG. 2 (e) is a top view of the fourth example of shorting bar construction;

FIG. 2 (f) is a top view of the fifth example of shorting bar construction;

DESCRIPTION OF A PREFERRED EMBODIMENT

Figure 1:
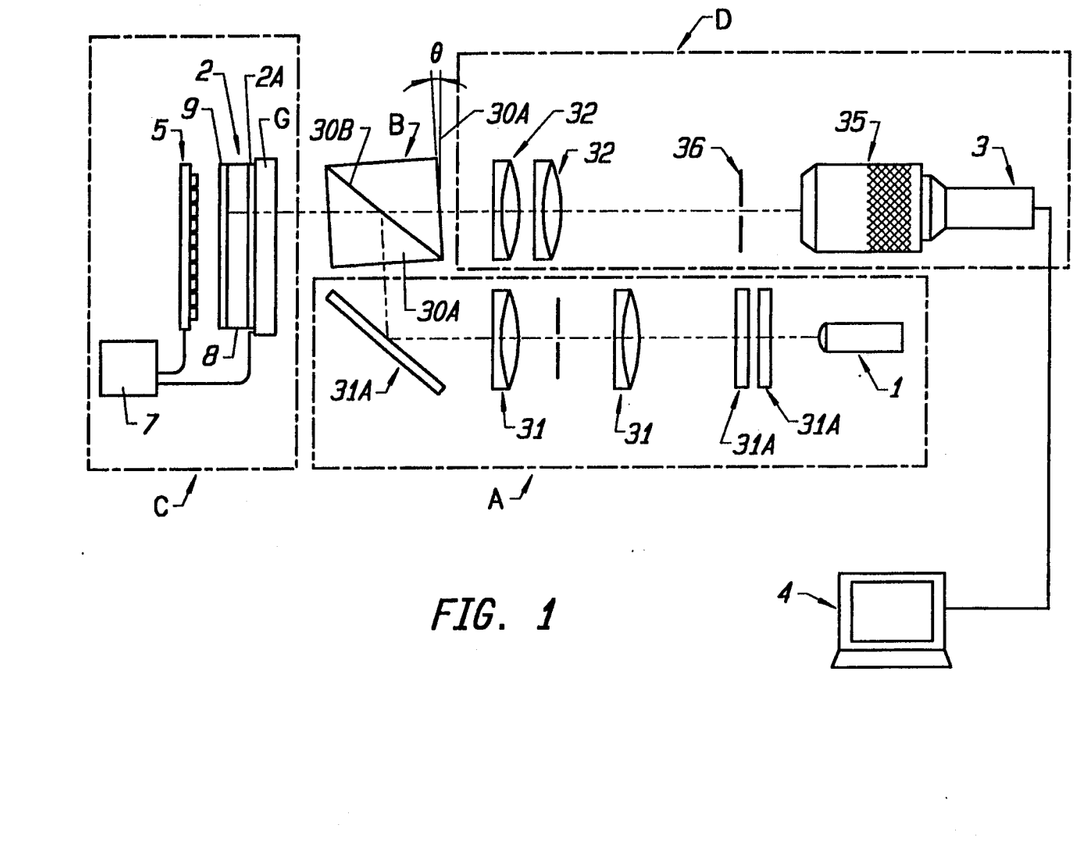
FIG. 1 shows an outline of the main portion of one embodiment of the testing instrument of the present invention.

FIG. 1 illustrates an outline of a major portion of one embodiment of the test instrument of the present invention. The test instrument comprises lighting source A with light source 1 to emit scanning light, light guide B to direct light emitted by lighting device A, detecting device C containing electro-optical element 2 through which the light beam from the light guide enters, imaging device D containing photo-receiver 3 to receive light reflected by electro-optical element 2, and monitor 4 connected to photo-receiver 3. Detecting device C is constructed so that liquid crystal display base plate 5 of the active matrix type, etc. can be placed facing electro-optical element 2.

Liquid crystal display base plate 5 can be tested by the test instrument as exemplified herein may vary in its shape as shown in FIGS. 2 (a) through (g), the details of which will be discussed later.

Figure 3:
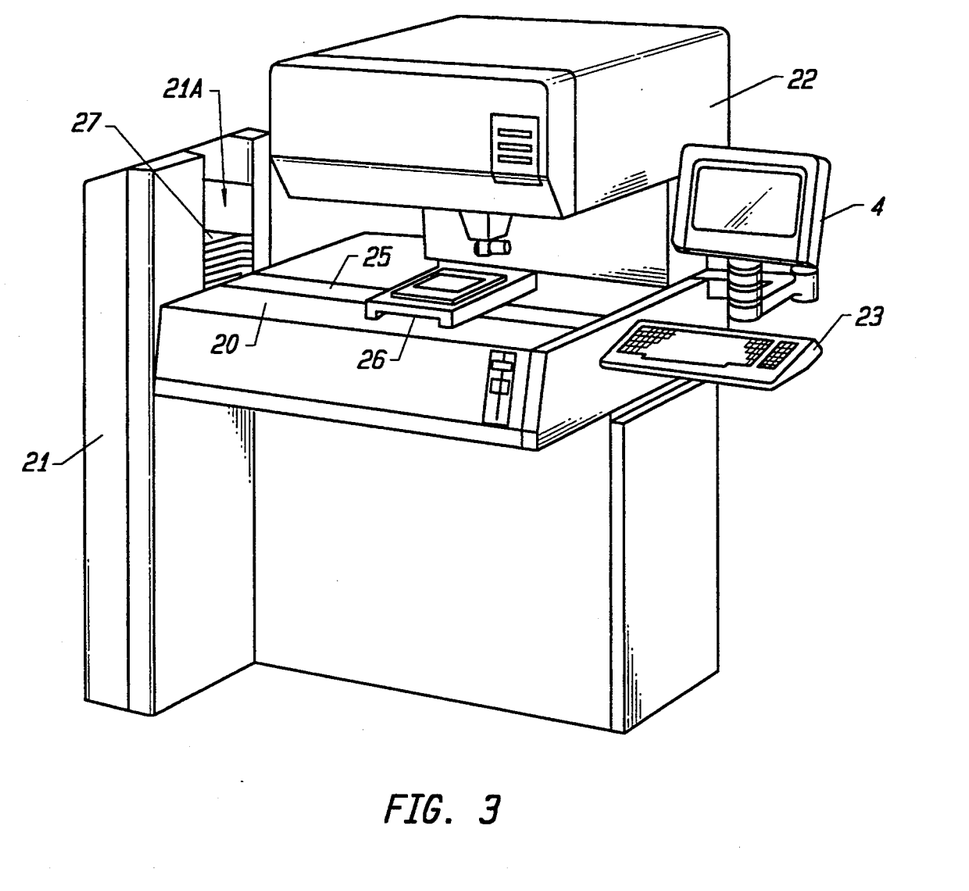
FIG. 3 is an overview of one configuration of the present invention.
Figure 4:
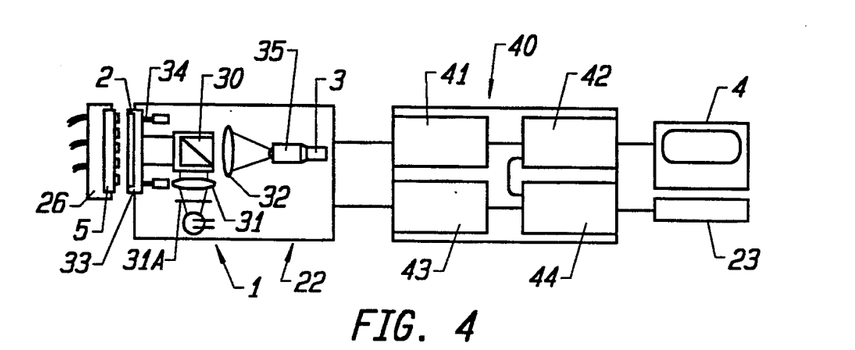
FIG. 4 shows one internal construction of a test head of the present invention.
Figure 5:
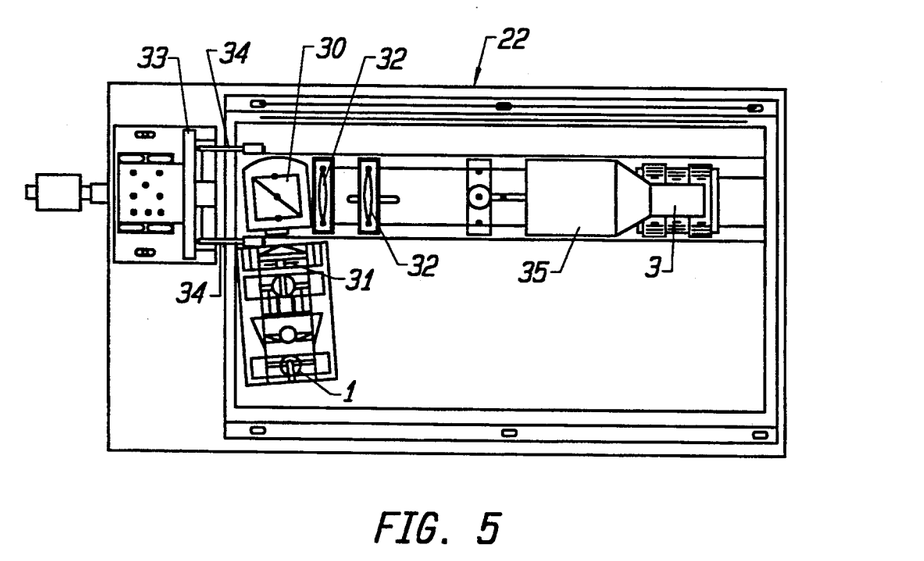
FIG. 5 shows one internal detail diagram of a test head of the present invention.

FIGS. 3–5 present the detailed construction of the embodiment of the test instrument. FIG. 3 shows bed 20, base plate storage (cassette rack) 21 located to the left side of bed 20, test head 22, and control panel 23. Guide rails 25 are located lengthwise on top and in the center of bed 20, providing table 26 with lengthwise movement along guide rails 25. In addition, a mechanism is installed underneath table 26 to allow table 26 to move perpendicularly with respect to guide rails 25. Therefore table 26 is capable of moving lengthwise as well as widthwise (or in X and Y directions) on the top plane of bed 20.

Figure 7:
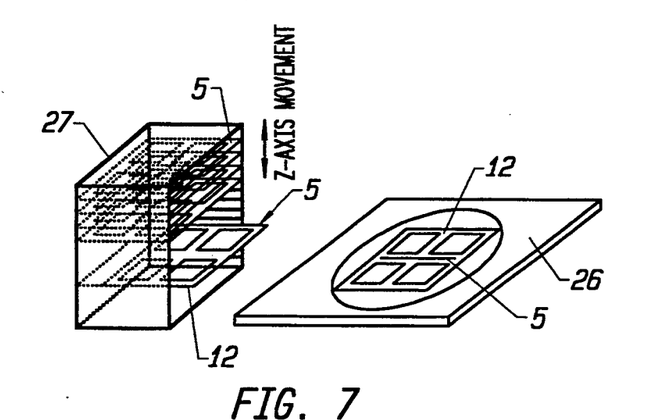
FIG. 7 is a diagram showing a liquid crystal display base plate being retrieved from base plate storage.

Base plate storage 21 accommodates cassettes 27 (see FIG. 7) housing multiple liquid crystal display base plates 5. Liquid crystal display base plates 5 can be retrieved in sequence from the opening of cassette 27 situated at the top of base plate storage 21 onto table 26.

The detailed optical system structure inside test head 22 is shown in FIG. 1 whereas the details of the internal structure of test head 22 are shown in FIGS. 4 and 5. The order of arrangement for the optical equipment in FIGS. 1, 4, and 5, however, can be freely changed to suit the location or the direction of orientation of the liquid crystal panels. FIGS. 1, 4, and 5 show vertical arrangement of the panels for easier explanation.

Inside test head 22 shown in FIG. 3 are light source 1 and photo-receiver 3, etc. as shown in FIG. 1. Light source 1 and photo-receiver 3 are directed towards beam splitter 3 respectively. Installed in between beam splitter 30 and light source 1 are reflective mirror 31A, adjusting lens 31, and filter 31a. Adjusting lens 32 is located between beam splitter 30 and photo-receiver 3.

On the left of beam splitter 30 in FIGS. 4 and 5 is holder 33 equipped with electro-optical element 2. Holder 33 can adjust its position with respect to active matrix liquid crystal display base plate 5 by support shaft 34. Photo-receiver 3 is equipped with zoom lens 35 at its front portion, allowing effective entry of light reflected by electro-optical element 2 into photo-receiver 3.

This construction allows the detecting beam emitted by light source 1 to enter the upper portion of electro-optical element 2 at a right angle to be reflected by optically reflective part 9 within electro-optical element 2, then to enter into photo-receiver 3 through beam splitter 30, lens 32, and zoom lens 35.

Light source 1 in the test instrument in the preferred embodiment is a halogen light, but laser beams of various kinds may be used instead of the halogen lamp as light source 1. The laser beams, however, will produce fine speckles of light on the surface of electro-optical element 2 when irradiating electro-optical element 2. The speckles may be detected as noise to produce what is known as speckle noise. For this reason, it is desirable to use halogen light.

Electro-optical element 2 is made of liquid crystal sheet or Pockets crystalline plate which changes its optical properties when an electrical field is applied across it.

Electro-optical element 2 shown in FIG. 1 is made of liquid crystal sheet 8 having liquid crystal sealed inside a transparent casing and an optically reflective part 9 such as a dielectric multi-layer film formed or bonded on the bottom thereof. In FIG. 1, letter G indicates a transparent glass plate installed on the top surface of electro-optical element 2.

Liquid crystal sheet 8, in particular, is NCAP (Nematic Curvilinear Aligned Phase), PDLC, or PN-LC which change light transmissivity in proportion to the magnitude of the electric field created within liquid crystal sheet 8. Liquid crystal suitable to be sealed in liquid crystal sheet 8 should be of a type wherein liquid crystal in the water droplet form is dispersed in a macromolecule, such as a polymer. By adjusting the size of the droplets of the macromolecule containing the liquid crystal, the liquid crystal exhibits transparency or non-transparency in response to the ON or OFF condition of an electric field, due to match or mismatch in the refractive indexes of the macromolecule and the liquid crystal (PN-LC). Another example of electro-optical element 2 is Pockels crystals which changes the magnitude of polarization of the reflected light depending on the size of applied electrical field.

Electro-optical element 2 used in this invention is not limited to the materials mentioned above, but it may be of any material so long as its optical properties including light transmissivity, polarization of reflected light, etc. change in response to the application of an electric field.

Photo-receiver 3 is a CCD camera, or the like. Use of a CCD camera eliminates the need for mechanically scanning the testing area, thus improving the process speed.

Filter 31a converts the beam of light emitted by halogen light 1 into a red beam. In particular, it is a filter which selectively allows passage of light whose wavelengths are near that of red out of the beam of various wavelengths. Use of a detecting beam chiefly consisting of red is more favorable because electro-optical element 2 is sensitive to red, reacts well to red light, and changes its light transmissivity optimally in response to red wavelengths. The CCD camera is readily reactive to red. Additionally, use of a heat insulating filter will eliminate infrared rays emitted by halogen light 1, protecting the electro-optical element and other components from damage.

Light guide B is a rectangular parallelopiped transparent vessel 30A made of glass or other material with translucent mirror 30B installed therein along the diagonal line of the sides of transparent vessel 30A. Side 30a of transparent vessel 30A on the side of photo-receiver 3 is angled with respect to a plane perpendicular to the optical axis. Angling transparent vessel 30A can prevent the reflected light at side 30a of transparent vessel 30A on the side of photo-receiver 3 that is highly likely to enter photo-receiver 3 from entering into photo-receiver 3 by stopping it at diaphragm 36 after it is collected by lens 32. Side 30a may be treated with a non-reflective coating, in which case, providing light guide B at an angle will increase effectiveness. For light guide B, a flat sheet type translucent mirror with a wedge angle may be used.

Figure 2A:
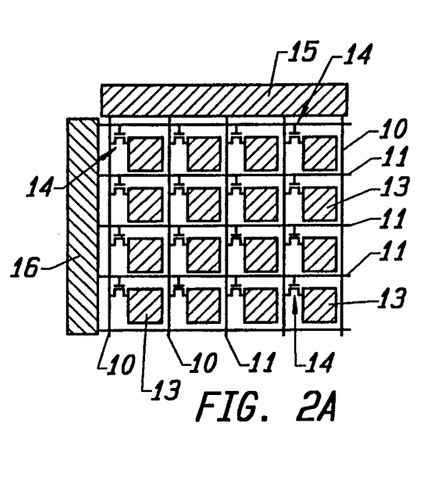
Figure 2B:
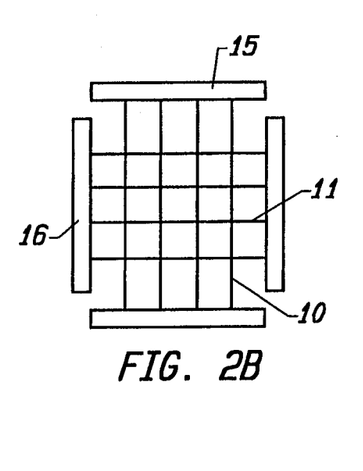
Figure 2C:
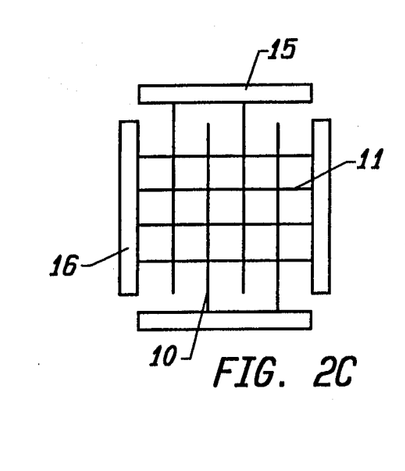
Figure 2D:
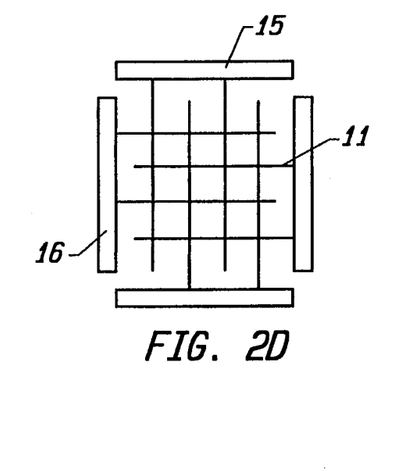
Figure 2E:
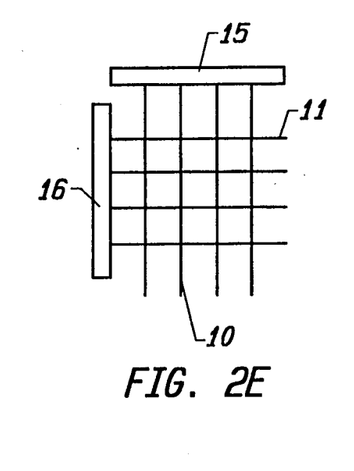
Figure 2F:
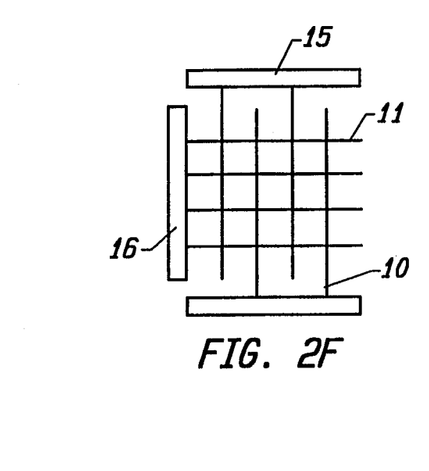

Liquid crystal display base plate 5 to be tested by the method of this invention is a well known product used for liquid crystal display panels. As shown in FIG. 2 (a), liquid crystal display base plate 5 comprises multiple source leads 10 for sending data signals and multiple gate leads 11 for sending scanning signals, both of which are formed in lines on base plate 12. Pixel element electrodes 13 arranged therebetween with connection to source leads 10 and gate leads 11 via switching elements 14 (thin layer transistors).

Many structures are known with regard to the structures of the leads, pixel element electrodes, and of the switching elements of liquid crystal display base plate 5. Any type of structure can be applied to the method of this invention, and therefore the structure of the liquid crystal display base plates is not restricted.

In FIG. 2, Reference number 15 indicates a shorting bar connected to source leads 10. Reference number 16 indicates shorting bar connected to gate leads 11. These shorting bars 15 and 16 are present at the time of the manufacturing stage of liquid crystal display base plate 5, but they are cut off and removed upon completion of manufacture of liquid crystal display base plate 5 during the subsequent process, including the placement of transparent base plates on the liquid crystal display base plates and the production of liquid crystal display panels by sealing liquid crystal therebetween.

Shorting bars 15 and 16 prevent static electricity from adversely affecting the thin film transistors. Testing by this testing method is possible if the liquid crystal base plates are in the forms shown in FIG. 2 (b) through (f), and also if actual drivers are installed instead of the shorting bars. Though detection of the line defects in the source and gate leads shown in FIG. 2 (b) and of those in the source leads shown in FIG. 2 (c) may be difficult without the optical testing method, the point at which defects which are known to be difficult to detect during the stages of the base plate assembly can be tested in those situations.

Reference number 7 in FIG. 1 indicates a voltage source to apply a voltage between thin transparent electrode 2a at the upper portion of electro-optical element 2 and liquid crystal display base plate 5. The voltage source is also capable of applying separate voltage pulses to the leads connected to the source and the gate leads. The pulse voltage, pulse width, and the frequency thereof can be changed and controlled. Voltage source 7 is equipped with a switch and a power source and is connected electrically to thin film layer transparent electrode 2a at the upper portion of electro-optical element 2, and shorting bars 15 and 16 of liquid crystal display base plate 5, enabling it to apply voltage to all pixel element electrodes 13 on liquid crystal display base plate 5 by way of the gate and the source leads. Voltage source 7 is able to apply separate pulse voltages to source leads 10 and gate leads 11. The pulse voltage, pulse width, and the frequency thereof can be changed and controlled.

Figure 12:
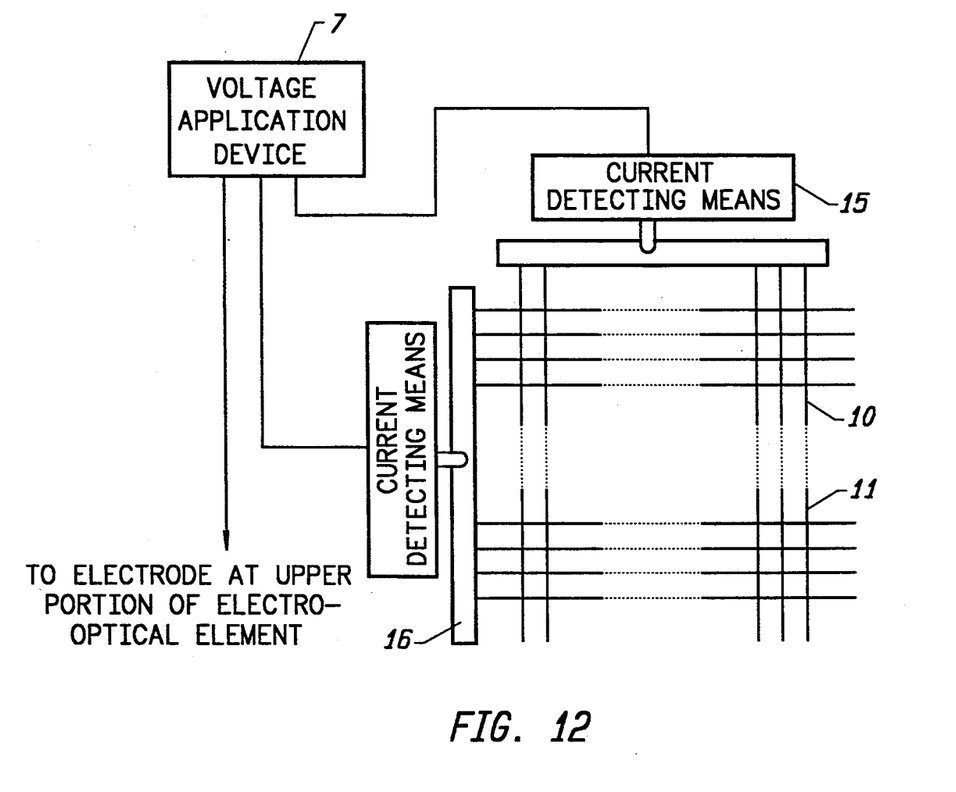
FIG. 12 shows one example of an electric field application device.

FIG. 12 shows the details of one example connection between said voltage application device 7 and liquid crystal display base plate 5.

If, for example, a liquid crystal display base plate is in the form of a shorting bar type as shown in FIG. 12, two probes extending from two terminals on voltage source 7 capable of outputting pulse voltage of +/−15 V are in contact with each shorting bar, 15 and 16 via two current detecting devices, one installed on the gate side and the other on the source side. Connection is made to thin layer transparent electrode 2a at the upper portion of the electro-optical element from another terminal which is capable of applying a constant voltage.

In FIG. 4, Reference number 40 is a controller which contains an analog to digital (A/D) converter 41 electrically connected to photo-receiver 3, image processor 42, drive circuit 43, and CPU 44. Image processor 42 is connected to display 4 whereas CPU 44 to control panel 23.

Controller 40 converts the intensity of light received by photo-receiver 3 into an equivalent voltage, displays it, and displays on monitor 4 the number of defects, defect location, and the type of defects of liquid crystal display base plate 5 according to the level of the voltage equivalent. The number of the defects can be displayed by entering the dimensions of each one pixel element, and masking the voltage equivalent distribution.

Figure 6:
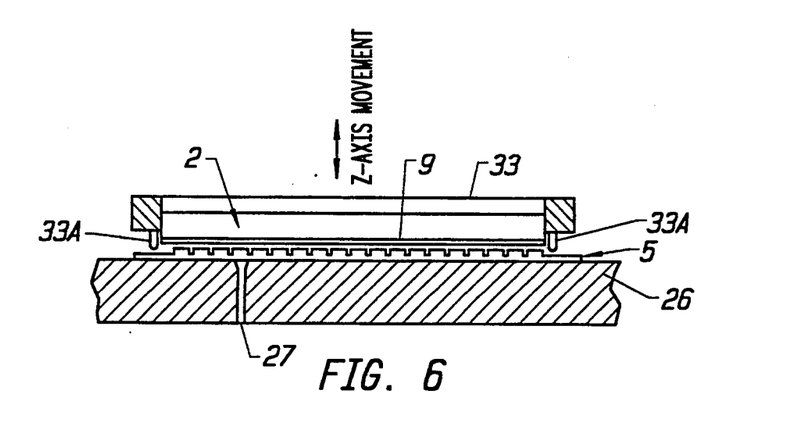
FIG. 6 is a side view showing positioning of a holder and a liquid crystal display base plate used by the present invention.

FIG. 6 shows liquid crystal display base plate 5 which is placed on table 26. Air passage 27 is formed vertically through table 26. Connected to the opening of passage 27 on the bottom of the table is a flexible pipe, not shown, in such a manner that it does not interfere with the movement of table 26, the other end of which is connected to a vacuum pump. Consequently, when liquid crystal display base plate 5 is placed on top table 26, this construction will allow drawing a vacuum through passage 27 to hold liquid crystal display base plate on top table 26.

The flow chart shown in FIG. 6 will be explained in sequence, utilizing the testing device as applied to liquid crystal display base plate 5 indicated in FIG. 2 (a).

The production line for liquid crystal display base plate 5 includes, among other processes, mask production process, thin film production process, resist process, exposure process, etching process, rinsing process, ion implantation process, etc. to form source leads 10, gate leads 11, pixel element electrodes 13, switching elements 14, and shorting bars 15 and 16 on base plate 12, thus producing liquid crystal display base plate 5. This production line is step S1 as indicated in FIG. 6.

Liquid crystal display base plate 5 in this example has multiple number (4 in this example) of square areas comprising source leads 10, gate leads 11, pixel element electrodes 13, switching elements 14, and shorting bars 15 and 16 on one base plate 12 as indicated in FIGS. 4 and 5.

In step S2, liquid crystal display base plate 5 produced in step S1 is transferred, while being kept in the cassette, to base plate storage 21 of the test instrument where it is set.

In step S3, liquid crystal display base plate 5 stored in base plate storage 21 is retrieved from base plate storage 21 onto table 26.

When liquid crystal display base plate 5 is set on table 26, in step S4, liquid crystal display base plate 5 is secured to table 26 by a vacuum chuck.

In step S5, table 26 is moved along guide rail 25 (X axis movement) as far as scanning head 22, then in step S6, table 26 is given a fine adjustment in X and Y directions to correctly position it at a predetermined location under scanning head 2.

Figure 8:
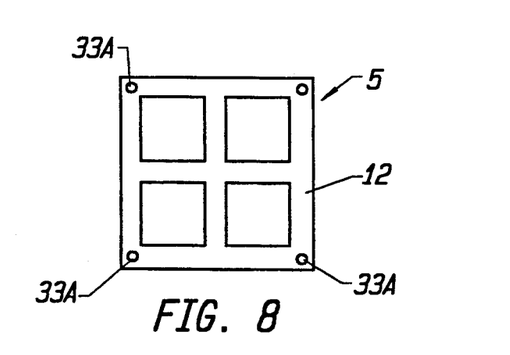
FIG. 8 shows a liquid crystal display base plate.
Figure 9:
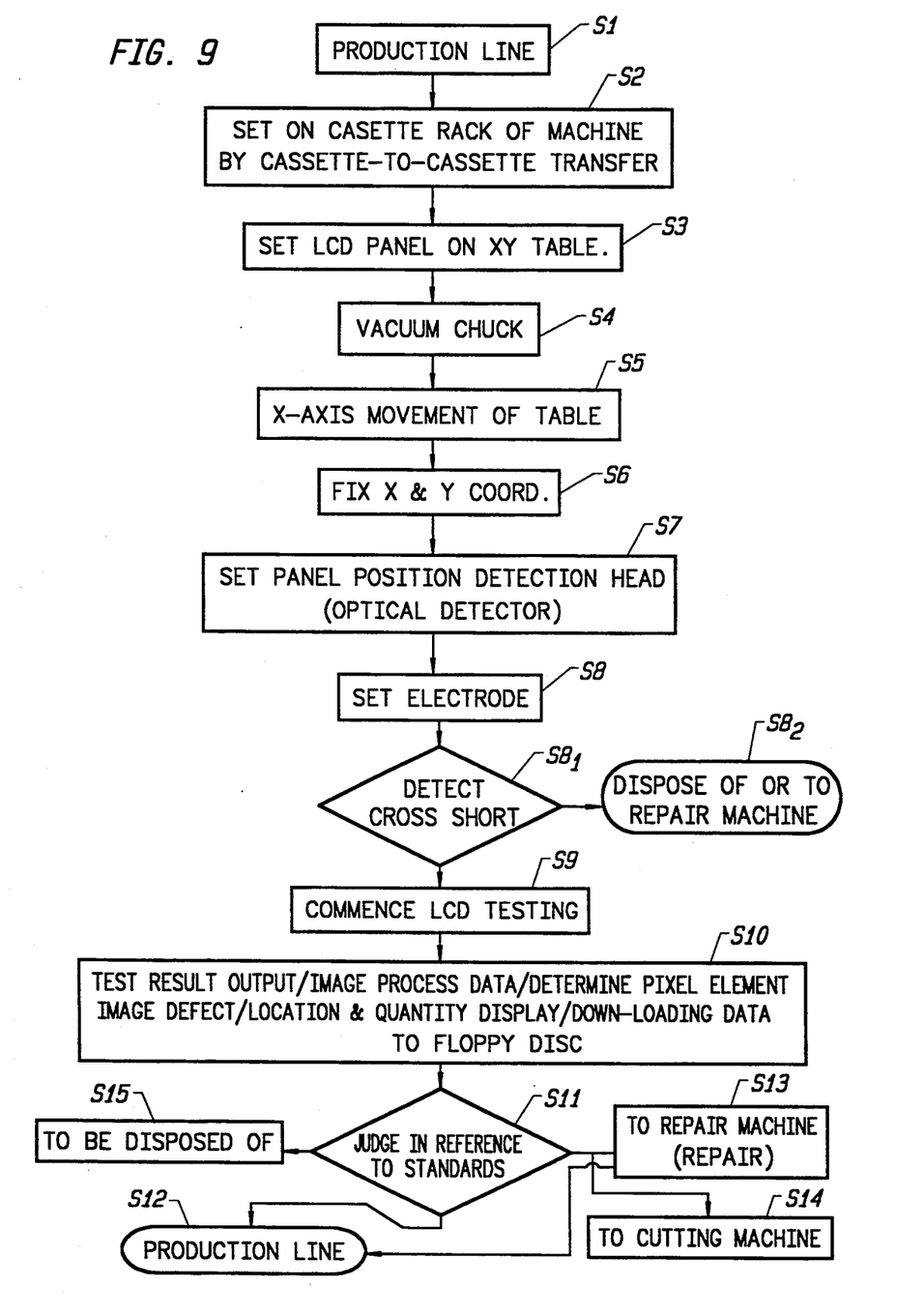
FIG. 9 is a flow chart showing one example of the test procedure.

In step S6, electro-optical element 2 is brought closer to liquid crystal display base plate 5 by moving holder 33 which is installed on scanning head 22. In this operation, positioning pivots 33a formed on the outer circumference of holder 33 press against predetermined locations on liquid crystal display base plate 5 for positioning and insuring a small gap therebetween. Liquid crystal display base plate 5 shown in FIG. 8 where one square base plate 12 has multiple areas each of which having the gate leads, source leads, pixel element electrodes, switching elements, shorting bars formed independently. Parallelism between liquid crystal display base plate 5 and electro-optical element 2 can be attained by pressing positioning pivots 33a of holder 33 against the predetermined locations at the four corners of base plate 12.

In step S8, the electrodes of voltage source 7 are connected to shorting bars 15 and 16 of liquid crystal display base plate 5.

In step S81, voltage on the source side is gradually increased to become a positive voltage with respect to that for the gate side while monitoring the leakage current between source leads 10 and gate leads 11 by way of a current detecting device. Detection of leakage current means a short-circuit (called cross short) between source leads 10 and gate leads 11. If there is no leakage current detected, step S9 will be executed. A liquid crystal display base plate 5 with a cross short should either be repaired by the repairing device in step S81 or disposed of.

In step S9, a bias voltage is applied in between the prewired electrodes at the upper portion of the electro-optical elements, and the electrodes connected to the gate and the source sides in step S8. The bias voltage should be AC or DC of a maximum of several volts in relation to the reference voltage (ground level, for example), and applied in an appropriate mode for defect testing. This operation generates an electric field between thin layer transparent electrode 2a at the upper portion of the electro-optical element and the pixel element electrodes on liquid crystal display base plate 5. If optically reflective part 9 formed on the bottom of electro-optical element 2 is a dielectric multi-layer coating, optically reflective part 9 will not affect the electric field. If optically reflective part 9 is made of metal such as aluminum (Al), it may affect the electric field of electro-optical element 2, adversely affecting testing accuracy. A metallic optically reflective part 9, however, may be used if it is formed on the bottom of the electro-optical element in such a manner that the metallic optically reflective part is divided to correspond 1 to 1 to the pixel element electrodes on the liquid crystal display base plate.

Figure 10:
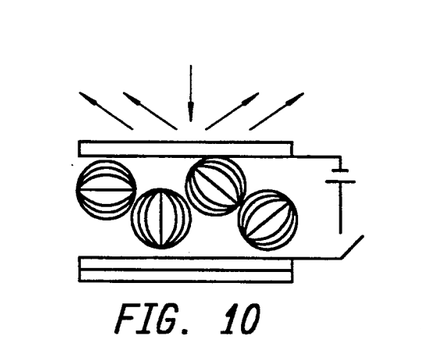
FIG. 10 shows a section of a liquid crystal sheet without electric field applied.
Figure 11:
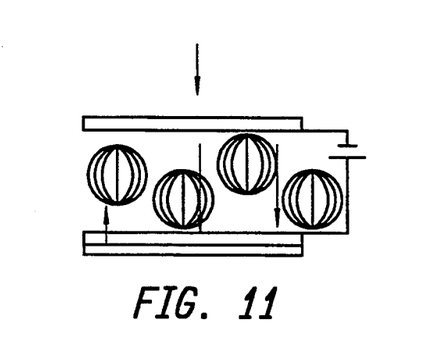
FIG. 11 shows a section of a liquid crystal sheet with electric field applied.

The behavior of electro-optical element 2 in these circumstances will be further described in detail here. When the previously described liquid crystal sheet is used as electro-optical element 2, the droplet liquid crystal molecules are disoriented as shown in FIG. 10 under no electrical field, dispersing light, thus preventing light from passing through. When an electrical field is applied as shown in FIG. 11, the liquid crystal molecules within the droplets become oriented to allow light to pass through. The transparent electrode has a field where it changes linearly as the voltage applied to the polymer dispersion type liquid crystal changes. Utilizing this linear formation, changes in the voltage can be observed as the changes in the amount of transmitted light.

A bias voltage corresponding to the linear field is applied in between pixel element electrodes 13 and thin layer transparent electrode 2a at the upper portion of electro-optical element 2.

Application of voltage in between said pixel element electrodes 13 and thin layer transparent electrode 2a at the upper portion of electro-optical element 2 generates an electric field. Changes made by each pixel element electrode 13 in the electrical field cause changes in the light transmissivity of electro-optical element 2.

In step S9, a light beam from light source I is irradiated through light guide B onto electro-optical element 2 where it is reflected by optically reflective part 9 through electro-optical element 2 again into photo-receiver 3 where the intensity of the reflected light is measured. Light guide B guides the beam of light onto the top surface of electro-optical element 2 at right angles to the surface of the electro-optical element, and in the direction of light transmissivity of the liquid crystal molecules inside electro-optical element 2 when an electric field is applied across the electro-optical element 2. It is of particular importance to guide the beam of light through light guide B perpendicular to the top surface of electro-optical element 2.

In step S10, controller 40 computes the light received by photo-receiver 3 to produce voltage equivalents. When the values of the voltage equivalents are identified, voltage equivalents generated at each pixel element are checked in reference to a threshold value. In step S11, the quality of the pixel element is determined by the brightness of the image or by the voltage equivalents. To determine acceptance or rejection of liquid crystal display base plate 5, a reference standard needs to be used. If a certain number of permissible defects in a liquid crystal display element of 1,000,000 pixel elements is predetermined, a user is able to judge acceptance or rejection of liquid crystal display base plate 5 based on the data resulting from the processed image.

In step S12, if the number of defects on liquid crystal display base plate 5 is within the allowable range, liquid crystal display base plate 5 is transferred to the next production step.

A liquid crystal display base plate 5 having a number of defects exceeding the permissible range, if reparable, is sent to repair in step S13, or to the cutting and the depositing machines in step S14 for repair. Upon completion of repairs, it is be returned to the production line in step S12. Liquid crystal display base plates 5 deemed irreparable in step S11 will be disposed of in step S15.

This invention closely duplicates the conventional final test of a liquid crystal panel but can be performed before assembly. Because testing occurs before liquid crystal panel assembly, repair of defects is relatively easy and the defective base plates are not sent to the subsequent processes, thus improving in-line yield.

Application of the teachings of this invention enable testing of various defects and handling of product while retaining static electricity protection for subsequent processes including the liquid crystal panel assembly process where static electricity is particularly likely to occur.

The test equipment of the present invention is versatile in its application. It can test liquid crystal display base plates with driver IC's installed in place of the shorting electrodes, liquid crystal display base plates with driver circuits installed, base plates with driver circuits, and those base plates without shorting electrodes.

In addition, the electro-optical elements can be built without the dimensional limitations of the pixel elements on the liquid crystal display base plates to be tested, is versatile, highly reliable, and inexpensive to build. Testing liquid crystal display base plate 5 can be made easier because this test equipment will display the locations, number, and the type of defects on liquid crystal display base plate 5.

The test equipment converts the light reflected from electro-optical element 2 into equivalent voltages in determining the existence of defects, providing a swift test in a short period of time. For example, when the inventors conducted a test on a 10-inch liquid crystal display base plate using a prototype test instrument that utilized a liquid crystal sheet as an electro-optical element, the spatial resolution of the liquid crystal sheet was less than 50 micrometers and the test was carried out at a rate of over 12 base plates per hour, including the handling (including mechanical rate-determining) of liquid crystal display base plate 5.

The light beam from the halogen light is filtered to become red by filter 31$a$, preventing generation of the speckle noise at electro-optical element 2, and improving the efficiency of a CCD camera (if used as photo-receiver 3).

Since light guide B guides the light beam from light source 1 onto the upper portion of electro-optical element 2, if liquid crystal is used as electro-optical element 2, the liquid crystal will either appear transparent or opaque at high resolution, sufficient for acceptance testing. Because light guide B has transparent vessel 30A situated at an angle with respect to a plane perpendicular to the optical axis, it will not allow the reflected light at transparent vessel 30A to enter photo-receiver 3. An increase in the number of the base plates to be processed can be readily achieved by adding photo-receiver 3 (CCD camera) thereby enabling testing of multiple active matrix liquid crystal display base plates 5 at one time.

An electro-optical element is placed over the liquid crystal display base plate to be tested and the pixel element electrodes on the liquid crystal display base plate and the thin layer transparent electrode at the upper portion of the electro-optical element are energized to change the optical properties of the electro-optical element. The changes in the intensity of light which passes through the electro-optical element are captured by a photo-receiver where they are compared to determine if defects exist on the liquid crystal display base plate. Since the detection output of the photo-receiver is an electric signal, accurate and fast detection of the defects on liquid crystal display base plates is made.

A liquid crystal sheet is used as the electro-optical element, and when a beam of light is irradiated perpendicularly into the liquid crystal sheet by way of a light guide, transmissivity of the light that passes through the liquid crystal sheet will identify the defective locations. The electro-optical element changes its light transmissivity in accordance with small electric fields generated by fine pixel element electrodes, and has excellent resolution and is quite suitable for testing liquid crystal display base plates having even finer pixel element electrodes. Guiding the beam of light perpendicularly into the liquid crystal sheet by a light guide, is sending the detecting beam in the direction at which the transmissivity change of the liquid crystal sheet is greatest, thus maximizing resolution.

Halogen or LED or other non-coherent light is utilized to prevent speckle noise from being generated in the electro-optical element. Conversion of the detecting beam emitted by a halogen light into red light by a filter improves the efficiencies of the electro-optical element and the photo-receiver resulting in more accurate testing. For LED light, no filtering is necessary.

A transparent vessel is employed as a light guide, the photo-receiver side of which is angled with respect to a plane perpendicular to the optical axis, thereby preventing light reflected on the side of the transparent vessel from entering the photo-receiver. In this way, light other than the reflected light from the electro-optical element are prevented from entering the photo-receiver, thus providing highly accurate testing.

A CCD camera is used as a photo-receiver, which enables testing of numerous pixel elements simultaneously, which improves processing speed.

What is claimed is:

1. An instrument for testing liquid crystal display base plate comprising:
    an electro-optical element having an optically reflective part at the lower portion thereof and a transparent electrode at the upper portion thereof, in which the optical properties change when an electrical field is applied across it is disposed over and with its lower portion facing the upper surface of a liquid crystal display base plate with an extremely small gap therebetween;
    a light source for irradiating light into said electro-optical element;
    a filter installed on said light source such that primarily red light of light emitted by said light source is allowed to pass through;
    a light guide for directing light emitted by said light source perpendicularly to the upper surface of said electro-optical element while at the same time directing light reflected by said electro-optical element away from said light source; and
    an imaging device having a photo-receiver for detecting reflected light from said electro-optical element through said light guide.

2. The instrument for testing liquid crystal display base plate as described in claim 1 wherein the light source is a halogen light.

3. The instrument for testing liquid crystal display base plates as described in claim 1 wherein said optically reflective part at the lower part of said electro-optical element is formed of a non-conductive dielectric multi-layer coating.

4. The instrument for testing liquid crystal display base plate as described in claim 1 wherein a light guide having a transparent vessel which is square in section and incorporates a translucent mirror therein and the surface of said transparent vessel on the side of said photo-receiver being angled with respect to a plane perpendicular to the optical axis.

5. The instrument for testing liquid crystal display base plate as described in claim 1 wherein a CCD camera employed for said photo-receiver.

6. An instrument for testing liquid crystal display base plate comprising:
    an electro-optical element having first and second sides, said first side being coated with a transparent conductor, said second side being coated with a non-conductive, optically reflective layer;
    a light source for irradiating said first side of said electro-optical element, said light source being filtered such that substantially all of the light irradiating said first side of said electro-optical element is red light;
    a light detector for detecting light reflected by said second side of said electro-optical element;
    a liquid crystal display base plate to be tested having a circuit side and a non-circuit side;
    said electro-optical element being placed adjacent to and slightly separated from said liquid crystal display base plate to be tested, such that said second side of said electro-optical element is facing said circuit side of said liquid crystal display base plate;
    a voltage source having one lead connected to said transparent electrode on said first side of said electro-optical element, and other leads connected to said circuit side of said liquid crystal display base plate; and
    circuitry located on said circuit side of said liquid crystal display base plate to be tested.

7. The instrument for testing liquid crystal display base plate of claim 6 in which said reflective layer located on said second side of said electro-optical element is formed of a dielectric multi-layer coating.

8. The instrument for testing liquid crystal display base plates of claim 6 in which said reflective layer located on said second side of said electro-optical element is instead formed of a conductive layer, divided up such that each discrete area on said liquid crystal display base plate has a corresponding area on said reflective layer.

9. The instrument for testing liquid crystal display base plates as described in claim 6 in which a charged couple device (CCD) camera is used as said photo detector.

10. The instrument for testing liquid crystal display base plates as described in claim 6 in which said light irradiating said first side of said electro-optical element is supplied in a direction parallel to the direction of a magnetic field which will be established between said first side of said electro-optical element and said circuitry on said circuit side of said liquid crystal display base plate when said voltage source is energized.

11. The instrument for testing liquid crystal display base plate as described in claim 10 in which a beam splitter is used to direct irradiating light at said first side of said electro-optical element, and to direct light reflected off said second side of said electro-optical element to said light detector.

12. An instrument for testing liquid crystal display base plate as described in claim 11 in which said beam splitter is substantially square and incorporates a translucent mirror therein.

13. An instrument for testing liquid crystal display base plate comprising:
    an electro-optical element having an electrically conductive side and a non-conductive, optically reflective side;
    a light source for irradiating said electro-optical element;
    a light detector for detecting light reflected by said electro-optical element;
    a voltage source for supplying a voltage across said electro-optical element;
    a liquid crystal display base plate to be tested having circuitry located on a circuit side;
    said electro-optical element oriented adjacent to and slightly spaced apart from said liquid crystal display base plate to be tested, such that said reflective side of said electro-optical element is facing said circuit side of said liquid crystal display base plate to be tested;
    said voltage source connected to said conductive side of said electro-optical element, and said circuit side of said liquid crystal display base plate to be tested;
    said light source irradiating said first side of said electro-optical element such that said irradiating beam of light is substantially parallel to the direction of an electric field created between said conductive side of said electro-optical element and said circuitry on said circuit side of said liquid crystal display base plate to be tested, said light source being filtered such that substantially all of the light irradiating said first side of said electro-optical element is red light; and said light detector arranged so as to detect light reflected by said reflective side of said electro-optical element.

14. The instrument for testing liquid crystal display base plate of claim 13 in which said reflective layer located on said second side of said electro-optical element is formed of a dielectric multi-layer coating.

15. The instrument for testing liquid crystal display base plate of claim 13 in which said reflective layer located on said second side of said electro-optical element is instead formed of a conductive layer, divided up such that each discrete area on said liquid crystal display base plate has a corresponding area on said reflective layer.

16. The instrument for testing liquid crystal display base plates as described in claim 13 in which a charged couple device (CCD) camera is used as said light detector.

17. The instrument for testing liquid crystal display base plates as described in claim 13 in which said light irradiating said first side of said electro-optical element is supplied in a direction parallel to the direction of a magnetic field which will be established between said first side of said electro-optical element and said circuitry on said circuit side of said liquid crystal display base plate when said voltage source is energized.

18. The instrument for testing liquid crystal display base plate as described in claim 17 in which a beam splitter is used to direct irradiating light at said first side of said electro-optical element, and to direct light reflected off said second side of said electro-optical element to said light detector.

19. An instrument for testing liquid crystal display base plate as described in claim 18 in which said beam splitter is square and incorporates a translucent mirror therein.

* * * * *